United States Patent Office 2,944,831
Patented July 12, 1960

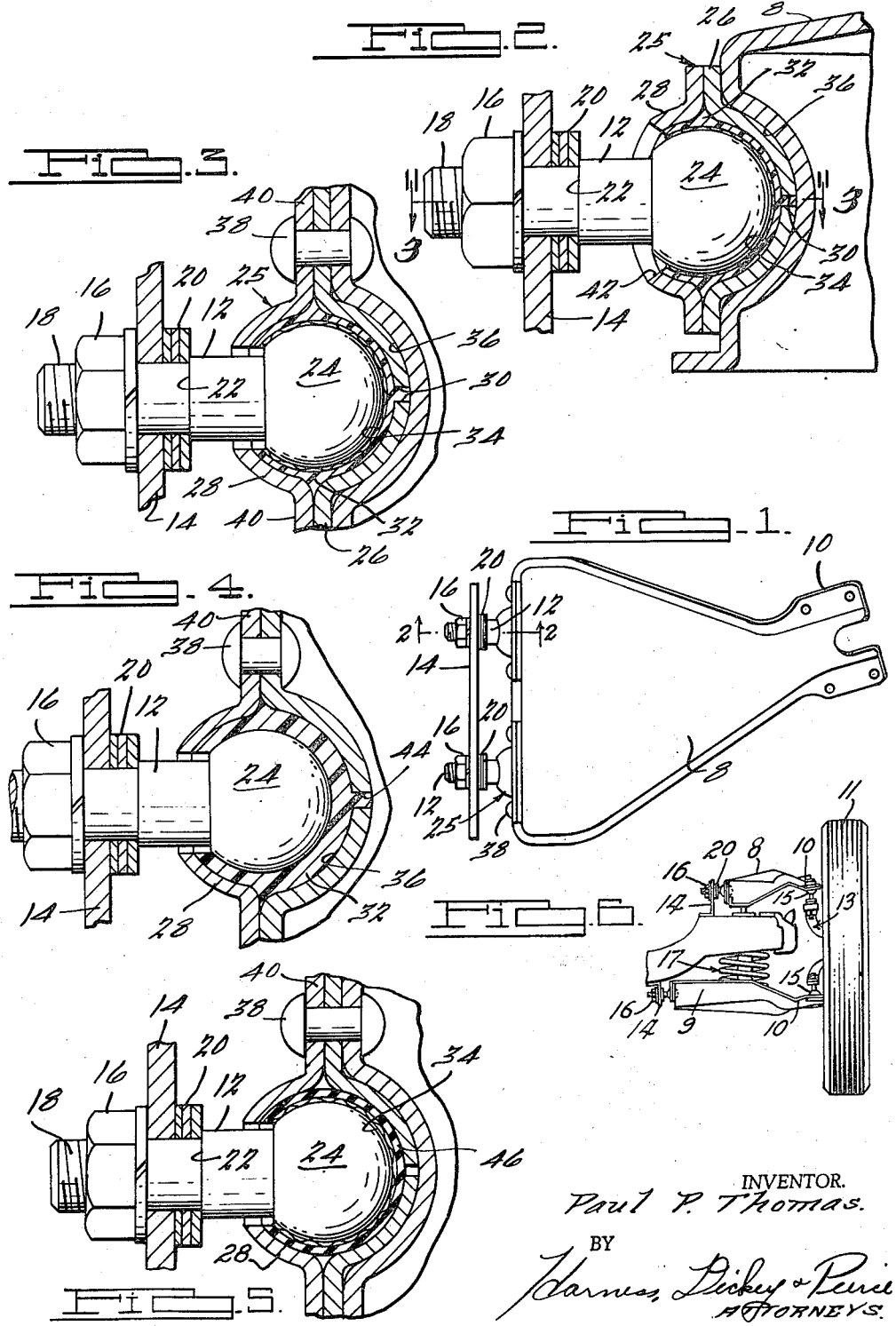

2,944,831

CONTROL ARM MOUNTING FOR VEHICLE WHEEL SUSPENSION

Paul P. Thomas, Detroit, Mich., assignor to American Metal Products Company, Detroit, Mich., a corporation of Michigan Filed Aug. 7, 1957, Ser. No. 676,751

16 Claims. (Cl. 280—96.1)

This invention relates to ball type hinge elements and more particularly to a ball type hinge element for fastening a control arm to the chassis frame of an automotive vehicle.

The main objects of the invention are to provide a ball type hinge element for fastening a control arm to the chassis frame of an automotive vehicle; to provide a ball type hinge element for fastening a control arm to the chassis frame of an automotive vehicle which can be easily adjusted to vary the camber or caster of the front wheel supported by the control arm; to provide a ball type hinge element having a stud projecting therefrom for fastening a control arm to the chassis frame of an automotive vehicle wherein the axis of the stud is disposed substantially in the plane of the control arm; to provide a ball type hinge element for fastening a control arm to the chassis frame of an automotive vehicle wihch is relatively inexpensive to fabricate, effective in use, and rugged in construction.

Other objects and features of novelty of the invention will be specifically pointed out or otherwise become apparent when referring, for a better understanding of the invention, to the following description taken in conjunction with the accompanying drawing, wherein:

Figure 1 is a broken plan view of structure embodying features of the present invention;

Fig. 2 is a sectional view of the structure illustrated in Fig. 1, taken along the line 2—2 thereof;

Fig. 3 is a sectional view of the structure illustrated in Fig. 2, taken along the line 3—3 thereof;

Fig. 4 is a sectional view similar to that of Fig. 3 illustrating another form of the invention; and Fig. 5 is a sectional view of structure similar to that of Fig. 3 illustrating still another form of the invention.

Fig. 6 is a fragmentary front elevational view of a front wheel suspension assembly embodying features of the present invention.

Referring to Fig. 1 a structure embodying features of the invention is comprised of a stamped metal control arm 8 having a bracket 10 on one end thereof adapted to be fastened to the front wheel of an automotive vehicle and two studs 12 projecting from the other end thereof for fastening the control arm to the chassis frame 14 of an automotive vehicle.

As most clearly illustrated in Figs. 2 and 3, the studs 12 are fastened to the chassis frame 14 by nuts 16 screwed onto threads 18 on the end of the stud 12. It will be observed that a plurality of washers 20 are disposed between a shoulder 22 on each of the studs 12 and the chassis frame 14 for a purpose which will be described in greater detail hereinafter.

An enlarged ball 24 is formed on the end of each of the studs 12 and is supported within a housing 25 having an upper half 26 and a lower half 28 joined together by welding or the like. The upper half 26 of the split housing has an aperture 30 therein to enable a hardenable cast backing material 32 to be injected between the housing and the ball 24 to conform a layer of Teflon or other low friction material 34 to the surface of the ball 24. In this manner the ball 24 is supported within the housing so as to permit limited universal movement therebetween.

After the bearing surface has been formed as described above, the housing 25 is positioned within a recess 36 and fastened to the control arm 8 by rivets 38, or the like, which pass through laterally extending flanges 40 of the housing.

It will be observed that the lower half 28 of the housing has an elongated aperture 42 therein which permits the stud 12 to pivot a greater amount in the plane of the drawing as illustrated in Fig. 2 than it is permitted to pivot in the plane of the drawing as illustrated in Fig. 3. The reason for this is that the control arm 8 is attached to the chassis frame 14 so that it is disposed in a substantially horizontally plane parallel to the ground. Therefore road shocks applied to the front wheel of the automotive vehicle will pivot the end 10 of the A-frame 8 about an axis passing between the centers of the balls 24, or clockwise and counterclockwise, as viewed in Fig. 2.

In actual practice two control arms 8 and 9 are provided for supporting a front wheel 11 of a vehicle as illustarted in Fig. 6. The control arms are disposed in parallel spaced-apart relationship one above the other with the ends 10 of each of the control arms connected to a steering knuckle assembly 13 by heavy, load carrying ball joints 15, the steering knuckle assembly of course having a spindle for rotatably supporting the wheel 11. A suitable spring and shock absorber assembly 17 is also provided for controlling the pivoting action of the control arms.

By mounting each control arm in this manner with the axis of the studs 12 extending in the plane of the control arm, the washers 20 may be inserted between the shoulder 22 and the chassis frame 14 to provide a simple and effective means for adjusting both the camber and the caster of each of the front wheels. Referring to Fig. 1, to adjust the camber of the front wheel it is only necessary to remove or add an even number of washers on both studs 12 of one of the control arms, so that it is moved inwardly or outwardly of the chassis frame 14. In this manner, if the other of the control arms supporting the front wheel is maintained in the same position or moved inwardly and outwardly of the chassis frame 14 in the opposite direction, the camber of the front wheel attached to the control arm will be suitably adjusted.

To adjust the caster of the front wheel it is only necessary to change the number of washers on the same side of each of the control arms so that the end 10 of the control arm is moved to the right or left in the plane of the drawing as illustrated in Fig. 1. It is apparent that it is primarily because the axis of each of the studs 12 lies substantially in the plane of the control arm and is angularly displaced from the axis about which the control arm pivots on the studs that the camber and caster of the front wheels may be adjusted in this unique and simple manner.

Referring to Fig. 4, another form of the invention is illustrated wherein the layer of Teflon or other low friction material 34 is not employed, the cast backing material 32 itself serving to provide the low friction bearing surface. The cast backing material 32 will produce a low friction oilless joint which performs satisfactorily under minimum movement and reasonable load conditions.

Preferably the surface of the balls 24 should have a flash plate of nickel and chrome or some other suitable rust-proofing surface to eliminate the problems of corrosive action which causes rusting or pitting of the ball's surface and which in time could cause deterioration of the ball's surface. Since the balls are substantially of true spherical form and the hardenable cast material 32 is molded directly thereto, a complete area contact is provided between the balls 24 and the surface of the cast backing material 32.

A number of materials are suitable for use as the hardenable material 32. Polyethylene molding compounds may be employed, two being procurable on the market, one under the name of Super-dyland, the other under the name of Marlex. Phenolic impregnated glass fibrous material procurable in the trade under the name of Durez, and a form of nylon material, procurable on the market, under the name of Zytel, have also been employed, as well as, a phenolic and polyethylene impregnated glass fibrous material. These materials do not have the extreme low friction characteristics of Teflon or the like but are satisfactory for some less severe applications.

It will also be observed in Fig. 4, that the wall of the control arm 8 has a recess 36 therein which forms one-half of the housing for enclosing the ball 24. In this embodiment, the lower half 28 of the housing illustrated in Figs. 2 and 3 is employed as before and in conjunction with the recess 36 provides an enclosure into which the cast backing material 32 may be injected through a suitable aperture 44 provided in the wall of the recess 36.

Referring to Fig. 5, another form of the invention is illustrated wherein the stud and ball is mounted as before, and the upper half 26 of the housing is employed as previously described, but a rubber backing material 46 is employed in place of the cast backing material 32 previously used. The rubber backing material 46 conforms the layer of Teflon or other low friction material 34 to the ball to provide the low friction bearing surface as previously described, but since it is flexible, it will yield to compensate for any out of round condition in the ball as the ball rotates relative to the layer of low friction material 34. The rubber backing material 46 also provides a means for dampening noise and vibrations as well as absorbing thrust loads. Reference is made to the copending application of Paul P. Thomas, Serial No. 672,799, filed on July 18, 1957, for a complete and full description of the use of rubber backing material as illustrated in Fig. 5 as well as other modifications in which the rubber backing material 46 may be employed.

Although in the above-described embodiments the studs 12 have been illustrated as being pivotally connected to the control arm by a ball joint, it is apparent that the studs could be pivotally connected thereto by other than the balls 24. It is to be understood that any such variation of the pivotal connections is within the purview of this invention which in its broader aspect encompasses studs pivotally connected to a control arm in a manner which permits the studs themselves to be adjustably connected to the chassis frame so that the camber and caster can be easily adjusted. By virtue of this construction, the conventional cross arm which is rigidly secured to the chassis frame for pivotally supporting the control arm can be eliminated.

What is claimed is:

1. A control arm construction for supporting the front wheel of an automotive vehicle comprising a control arm having one end adapted to be attached to said front wheel, two studs having enlarged balls on one end thereof, means for oscillatably mounting said balls in the other end of the control arm in spaced-apart relation with the studs thereon normally projecting in a direction away from said one end of the control arm substantially longitudinally of the control arm, and means for securing said studs to the chassis frame whereby caster and camber adjustment is permitted.

2. A control arm construction for supporting the front wheel of an automotive vehicle comprising a control arm having one end adapted to be attached to said front wheel, two studs having enlarged balls on one end thereof, means for oscillatably mounting said balls in the other end of the control arm in spaced-apart relation so that the studs project therefrom normally in the plane of the control arm and in a direction away from said one end of the control arm substantially longitudinally of the control arm, and means for adjustably securing the other ends of said studs to the chassis frame whereby caster and camber adjustment is permitted.

3. A control arm construction for supporting the front wheel of an automotive vehicle comprising a control arm having one end adapted to be attached to said front wheel, two studs having enlarged balls on one end thereof, means for oscillatably mounting said balls in the other end of the control arm in spaced-apart relation so that the studs project outwardly normally in the plane of the control arm and in a direction away from said one end of the control arm substantially longitudinally of the control arm, means for securing the other ends of said studs to the chassis frame, and means for axially varying the position of each of the studs relative to the chassis frame whereby caster and camber adjustment is permitted.

4. A control arm construction for supporting the front wheel of an automotive vehicle comprising a control arm having one end adapted to be attached to said front wheel, two studs having enlarged balls on one end thereof and a threaded portion on the other end thereof with a shoulder intermediate the ends thereof, means for oscillatably mounting said balls in the other end of the control arm in spaced-apart relation so that the studs project outwardly in a direction away from said one end of the control arm and in the plane of the control arm, a nut screwed on each of said threaded portions for securing the studs to the chassis frame, and a plurality of washers disposed between the shoulders on each of the studs and the chassis frame whereby the spacing between the shoulders and the chassis frame may be varied in accordance with the number of washers used.

5. A control arm construction for supporting the front wheel of an automotive vehicle comprising a control arm having one end adapted to be attached to said front wheel, two studs having enlarged balls on one end thereof, housings enclosing each of said balls, hardenable cast backing material between the housings and the balls and conforming to the balls to provide a low friction bearing surface therebetween, said housings being secured to the other end of the control arm in spaced-apart relation so that the studs project outwardly in the plane of the control arm substantially longitudinally of the control arm, and means for adjustably securing the studs to the chassis frame whereby caster and camber adjustment is permitted.

6. A control arm construction for supporting the front wheel of an automotive vehicle comprising a control arm having one end adapted to be attached to said front wheel, two studs having enlarged balls on one end thereof, housings enclosing each of said balls, a layer of low friction bearing material disposed between the balls and the housings, hardenable cast backing material within the housings so as to conform the layers of low friction bearing material to the balls to provide a bearing surface therebetween, means for securing each of said housings to the control arm in spaced-apart relation with the studs projecting outwardly generally in the plane of the control arm substantially longitudinally of the control arm, and means for securing the other ends of said studs to the chassis frame whereby caster and camber adjustment is permitted.

7. A control arm construction for supporting the front wheel of an automotive vehicle comprising a control arm having one end adapted to be attached to said front wheel, two studs having enlarged balls on one end thereof, housings disposed over each of said balls, a layer of low friction bearing material disposed between the housings and the balls, rubber backing material disposed within the housings so as to conform the layers of low friction material to the balls to provide a low friction bearing surface therebetween, means for attaching the housings to the control arm in spaced-apart relation with the studs projecting therefrom generally in the plane of the control arm substantially longitudinally of the control arm, and means for adjustably securing the studs to the chassis frame whereby caster and camber adjustment is permitted.

8. A control arm construction for supporting the front wheel of an automotive vehicle comprising a control arm having one end adapted to be attached to said front wheel and the other end having spaced-apart hemispherical recesses therein, two studs having enlarged balls on one end thereof disposed within said hemispherical recesses, housings positioned over each of the studs and attached to the control arm for enclosing the remainder of the balls, hardenable cast backing material within the housings and conforming to the balls to provide a low friction bearing surface therefor, said studs projecting generally in the plane of the control arm substantially longitudinally of the control arm, and means for adjustably securing the studs to the chassis frame whereby caster and camber adjustment is permitted.

9. A control arm construction for supporting the front wheel of an automotive vehicle comprising a control arm having one end adapted to be attached to said front wheel and the other end having spaced-apart hemispherical recesses therein, two studs having enlarged balls on one end thereof disposed within said hemispherical recesses, housings positioned over each of the studs and attached to the control arm for enclosing the remainder of the balls, a layer of low friction bearing material disposed within the housings and about each of the balls, hardenable cast backing material within the housings and conforming the layers of low friction bearing material to the balls to provide a bearing surface therebetween, said studs projecting generally in the plane of the control arm substantially longitudinally of the control arm, and means for adjustably securing the other ends of said studs to the chassis frame whereby caster and camber adjustment is permitted.

10. A control arm construction for supporting the front wheel of an automotive vehicle comprising a control arm having one end adapted to be attached to said front wheel and the other end having spaced-apart hemispherical recesses therein, studs having enlarged balls on one end thereof disposed within said hemispherical recesses, housings positioned over each of the studs and attached to the control arm for enclosing the remainder of the balls, a layer of low friction material disposed within each of the housings and about each of the balls, hardenable cast backing material within the housings and conforming the layers of low friction material to the balls to provide a bearing surface therebetween, said studs projecting generally in the plane of the control arm substantially longitudinally of the control arm, means for securing the other ends of said studs to the chassis frame, and means for axially varying the position of each of the studs relative to the chassis frame whereby caster and camber adjustment is permitted.

11. A control arm construction for supporting the front wheel of an automotive vehicle comprising a control arm having one end adapted to be attached to said front wheel and the other end having spaced-apart hemispherical recesses therein, studs having enlarged balls on one end thereof disposed within said hemispherical recesses, housings positioned over each of the studs and attached to the control arm for enclosing the remainder of the balls, a layer of low friction material disposed within each of the housings and about each of the balls, hardenable cast backing material within the housings and conforming the layers of low friction material to the balls to provide a low friction bearing surface therefor, said studs projecting generally in the plane of the control arm and having a shoulder intermediate the ends thereof with a threaded portion on the other end thereof, a nut screwed on each of said threaded portions for securing the studs to the chassis frame, and a plurality of washers disposed between the shoulders on each of the studs and the chassis frame whereby the spacing between the shoulders and the chassis frame may be varied in accordance with the number of washers used.

12. A control arm construction for supporting the front wheel of an automotive vehicle comprising a control arm having one end adapted to be attached to said front wheel and the other end having spaced-apart hemispherical recesses therein, studs having enlarged balls on one end thereof disposed within said hemispherical recesses, housings positioned over each of the studs and attached to the control arm for enclosing the remainder of the balls, said studs projecting away from said one end of the control arm generally in the plane of the control arm and having a shoulder intermediate the ends thereof with a threaded portion on the other end thereof, a nut screwed on each of said threaded portions for securing the studs to the chassis frame, and a plurality of washers disposed between the shoulders on each of the studs and the chassis frame whereby the spacing between the shoulders and the chassis frame may be varied in accordance with the number of washers used.

13. A control arm construction for supporting the front wheel of an automotive vehicle comprising two control arms disposed one above the other in spaced relation, one end of each of the control arms being adapted to be attached to said front wheel in a manner to permit universal movement therebetween, and hinge means for connecting the other ends of the control arms to the chassis frame, said hinge means comprising two pairs of studs having enlarged balls on the ends thereof, means for oscillatably mounting said balls in said other end of each of the control arms in spaced-apart relation with the studs projecting therefrom normally in the plane of the control arm to which they are connected substantially longitudinally of the control arm, and means for adjustably securing the other ends of the studs to the chassis frame whereby caster and camber adjustment is permitted.

14. A control arm construction for supporting the front wheel of an automotive vehicle comprising a control arm having one end adapted to be attached to said front wheel, two studs pivotally connected to the other end of the control arm in spaced apart relation so as to project therefrom in a direction away from said one end of the control arm, both of said studs pivoting about the same axis, and means for adjustably securing the projecting ends of said studs to the chassis frame whereby caster and camber adjustment is permitted.

15. A control arm construction for supporting the front wheel of an automotive vehicle comprising a control arm having one end adapted to be attached to said front wheel, two studs pivotally connected to the other end of the control arm in spaced apart relation so as to project therefrom in a direction away from said one end of the control arm, both of said studs pivoting about the same axis, said control arm being adapted to pivot about said axis on said studs, means for securing the projecting ends of said studs to the chassis frame, and means for axially varying the position of each of the studs relative to the chassis frame whereby caster and camber adjustment is permitted.

16. A control arm construction for supporting the front wheel of an automotive vehicle comprising a control arm having one end adapted to be attached to said front wheel, two studs pivotally connected to the other end of the control arm in spaced apart relation so as to project therefrom in a direction away from said one end of the control arm substantially longitudinally of the control arm, said control arm being adapted to pivot about said axis on said studs, said studs having a threaded portion on the projecting end thereof and a shoulder intermediate the ends thereof, a nut screwed on each of said threaded portions for securing the studs to the chassis frame, and a plurality of washers disposed between the shoulders on each of the studs and the chassis frame whereby the spacing between the shoulders and the chassis frame may be varied in accordance with the number of washers used whereby caster and camber adjustment is permitted.

References Cited in the file of this patent

UNITED STATES PATENTS

| | | |
|---|---|---|
| 1,881,601 | Hufferd et al. | Oct. 11, 1932 |
| 1,900,617 | Ricardo | Mar. 7, 1933 |
| 2,096,115 | Leighton | Oct. 19, 1937 |
| 2,303,545 | Graham | Dec. 1, 1942 |
| 2,339,533 | Wahlberg et al. | Jan. 18, 1944 |
| 2,553,743 | Booth | May 22, 1951 |
| 2,678,830 | Cigan et al. | May 18, 1954 |
| 2,737,398 | Mohr | Mar. 6, 1956 |
| 2,835,521 | White | May 20, 1958 |

FOREIGN PATENTS

| | | |
|---|---|---|
| 1,091,445 | France | Oct. 27, 1954 |
| 1,117,481 | France | Feb. 27, 1956 |